United States Patent
Guo

(10) Patent No.: US 10,245,648 B2
(45) Date of Patent: Apr. 2, 2019

(54) ALUMINUM ALLOY HUB LATHE FIXTURE

(71) Applicant: CITIC Dicastal CO., LTD, Qinhuangdao (CN)

(72) Inventor: Jiandong Guo, Qinhuangdao (CN)

(73) Assignee: CITIC Dicastal CO., LTD, Qinhuangdao (CN)

(*) Notice: Subject to any disclaimer, the term of this patent is extended or adjusted under 35 U.S.C. 154(b) by 34 days.

(21) Appl. No.: 15/499,109

(22) Filed: Apr. 27, 2017

(65) Prior Publication Data

US 2017/0312833 A1 Nov. 2, 2017

(30) Foreign Application Priority Data

Apr. 30, 2016 (CN) .......................... 2016 1 0277191

(51) Int. Cl.
*B23B 31/14* (2006.01)
*B23B 31/16* (2006.01)
*B23B 31/30* (2006.01)

(52) U.S. Cl.
CPC .............. *B23B 31/14* (2013.01); *B23B 31/16* (2013.01); *B23B 31/16275* (2013.01); *B23B 31/30* (2013.01); *B23B 2215/08* (2013.01); *B23B 2222/04* (2013.01); *Y10T 279/1291* (2015.01); *Y10T 279/243* (2015.01)

(58) Field of Classification Search
CPC .............. B23B 31/14; B23B 31/16275; B23B 2215/08; B23B 31/30; Y10T 279/1291; Y10T 279/243
See application file for complete search history.

(56) References Cited

U.S. PATENT DOCUMENTS

| 2,729,459 | A | * | 1/1956 | Leifer | B23B 31/14 279/119 |
| 3,938,815 | A | * | 2/1976 | F'Geppert | B23B 31/14 279/110 |
| 3,975,030 | A | * | 8/1976 | Akeel | B23B 31/1605 279/113 |
| 3,984,114 | A | * | 10/1976 | Ovanin | B23B 31/14 279/119 |
| 4,009,888 | A | * | 3/1977 | Wallace | B23B 31/14 279/119 |
| 4,078,814 | A | * | 3/1978 | Rohm | B23B 31/14 279/121 |
| 4,097,053 | A | * | 6/1978 | Steinberger | B23B 31/14 279/121 |

(Continued)

*Primary Examiner* — Eric A Gates
(74) *Attorney, Agent, or Firm* — Maier & Maier, PLLC

(57) ABSTRACT

An aluminum alloy hub lathe fixture, which includes a main plate, a mounting seat, a hydraulic power clamping head, a pull rod, a sliding seat, a connecting pin, a fan-shaped clamping jaw, a sealing cover, a deflection block, a deflection shaft, a centrifugal force balance block, a centrifugal mechanism base, a spring and screws, wherein the main plate and the mounting seat are connected together through screws, so that a housing of the entire fixture is formed; the hydraulic power clamping head is fixed on the mounting seat through screws; one end of the pull rod is mounted on the hydraulic power clamping head through screws, and the other end of the pull rod is connected with the sliding seat through the connecting pin; the fan-shaped clamping jaw is fixed on the sliding seat through screws.

2 Claims, 1 Drawing Sheet

(56) References Cited

U.S. PATENT DOCUMENTS

| | | | | |
|---|---|---|---|---|
| 4,240,645 | A * | 12/1980 | Rohm | B23B 31/14 279/121 |
| 4,275,892 | A * | 6/1981 | Rohm | B23B 31/14 279/121 |
| 4,411,440 | A * | 10/1983 | Becker | B23B 31/16254 279/137 |
| 4,431,201 | A * | 2/1984 | Morisaki | B23B 31/14 279/110 |
| 4,437,675 | A * | 3/1984 | Koenig, III | B23B 31/14 279/119 |
| 4,507,031 | A * | 3/1985 | Hiestand | B23B 31/14 279/121 |
| 4,508,357 | A * | 4/1985 | Reich | B23B 31/16287 279/130 |
| 4,572,524 | A * | 2/1986 | Hiestand | B23B 31/14 279/110 |
| 4,645,219 | A * | 2/1987 | Link | B23B 31/14 279/118 |
| 4,696,209 | A * | 9/1987 | Felten | B23B 31/00 279/130 |
| 4,824,126 | A * | 4/1989 | Martin | B23B 31/18 279/109 |
| 5,052,700 | A * | 10/1991 | Howard | B23B 31/16229 279/106 |
| 5,340,130 | A * | 8/1994 | Gorse | B23B 31/16045 279/110 |
| 5,842,703 | A * | 12/1998 | Antoni | B23B 31/16233 279/123 |
| 6,017,266 | A * | 1/2000 | Tabachenko | B23B 31/14 279/121 |
| 6,089,578 | A * | 7/2000 | Chai | B23B 31/32 279/123 |
| 6,343,797 | B1 * | 2/2002 | Tajnafoi | B23B 31/14 279/121 |
| 6,425,584 | B1 * | 7/2002 | Stickney | B23B 31/001 279/119 |
| 6,454,278 | B1 * | 9/2002 | Wrobel | B23B 31/14 279/106 |
| 6,467,775 | B1 * | 10/2002 | Denzinger | B32B 31/16212 279/119 |
| 6,655,699 | B2 * | 12/2003 | Grobbel | B32B 31/18 279/118 |
| 7,198,277 | B2 * | 4/2007 | Gatton | B32B 31/14 157/16 |
| 7,762,560 | B2 * | 7/2010 | Gross | B23B 31/14 279/110 |

* cited by examiner

ALUMINUM ALLOY HUB LATHE FIXTURE

TECHNICAL FIELD

The invention relates to a lathe fixture, in particular to an aluminum alloy hub lathe fixture.

BACKGROUND ART

Before aluminum alloy hubs are turned, firstly the hubs need to be positioned and clamped.

Conventional positioning and clamping are performed on a special lathe fixture. At this moment, fixtures need to be changed and adjusted in advance according to the diameter sizes of the aluminum alloy hubs, particularly, the diameter sizes of the hubs to be processed need to be known in advance, then an appropriate lathe fixture is changed, and normal turning and processing can be performed.

If the aluminum alloy hubs to be processed are different in diameter sizes and diversified in specifications, the lathe fixtures with various specifications need to be prepared, and before the aluminum alloy hubs are processed, the lathe fixtures are changed and adjusted according to the diameter sizes of the hubs, thereby causing the waste of processing time, the improvement of the labor intensity of workers, and the reduction of the yield;

besides, the fixture is in a high-speed rotation in a cutting process, and at this moment, the parts and components of the fixture can produce centrifugal force, which can influence the smoothness of the cutting process and cause quality defects of cutter vibration, inaccurate positioning and the like.

SUMMARY OF THE INVENTION

The invention aims to provide an aluminum alloy hub lathe fixture.

In order to realize the purpose, the technical scheme adopted by the invention lies in that the aluminum alloy hub lathe fixture comprises a main plate, a mounting seat, a hydraulic power clamping head, a pull rod, a sliding seat, a connecting pin, a fan-shaped clamping jaw, a sealing cover, a deflection block, a deflection shaft, a centrifugal force balance block, a centrifugal mechanism base and a spring, wherein the main plate and the mounting seat are connected together through first screws, so that a housing of the entire fixture is formed, and all parts and components are mounted in the fixture; the hydraulic power clamping head is fixed on the mounting seat through second screws, one end of the pull rod is mounted on the hydraulic power clamping head through third screws, and the other end of the pull rod is connected with the sliding seat through the connecting pin; the fan-shaped clamping jaw is fixed on the sliding seat through fourth screws, and the hydraulic power clamping head can drive the sliding seat and the fan-shaped clamping jaw to move forwards and backwards through the pull rod; the deflection block, the deflection shaft, the centrifugal force balance block and the spring are all mounted on the centrifugal mechanism base, so that a centrifugal force balance system is formed, and fixed on the mounting seat. When the fixture rotates at a high speed, the centrifugal force balance block slips towards the outer side to abut against the lower part of the deflection block, so that the deflection block slightly deflects around the deflection shaft, and the upper part of the deflection block abuts against the sliding seat to have the effect of offsetting the centrifugal force of the sliding seat; the spring has the buffering effect, the sealing cover is mounted above the main plate to have the sealing and positioning effects, and the entire fixture is connected with a machine tool through sixth screws.

When the entire fixture does not work, through the pull rod, the hydraulic power clamping head drives the sliding seat and the fan-shaped clamping jaw to be at positions where the sliding seat and the fan-shaped clamping jaw have largest diameters.

During work, the aluminum alloy hubs need to be put at appropriate positions according to the diameter sizes of the aluminum alloy hubs, the hubs with larger diameters are put on an upper step of the fan-shaped clamping jaw, and the hubs with smaller diameters are put on a bottom step of the fan-shaped clamping jaw;

then, the hydraulic power clamping head drives the sliding seat and the fan-shaped clamping jaw to operate towards the direction of the center of a circle through the pull rod, until the positioning and compacting work on the aluminum alloy hubs is completed;

then the entire fixture can rotate at a high speed, namely the aluminum alloy hubs can be cut; in the cutting process, in order to avoid the fan-shaped clamping jaw and the sliding seat from generating outward centrifugal force to cause cutting vibration, under the action of centrifugal force, the centrifugal force balance block can slip towards the outer side and abut against the lower part of the deflection block, so that the deflection block slightly deflects around the deflection shaft, and the upper part of the deflection block abuts against the sliding seat to have the effect of offsetting the centrifugal force of the sliding seat and the centrifugal force of the fan-shaped clamping jaw.

The invention has the characteristics of being wide in compatible range and stable in operation, and is suitable for aluminum alloy hub mechanical processing lathes.

BRIEF DESCRIPTION OF THE DRAWINGS

The invention will now be described below with reference to the drawings and the embodiments.

DETAILED DESCRIPTION OF THE INVENTION

Figure 1:
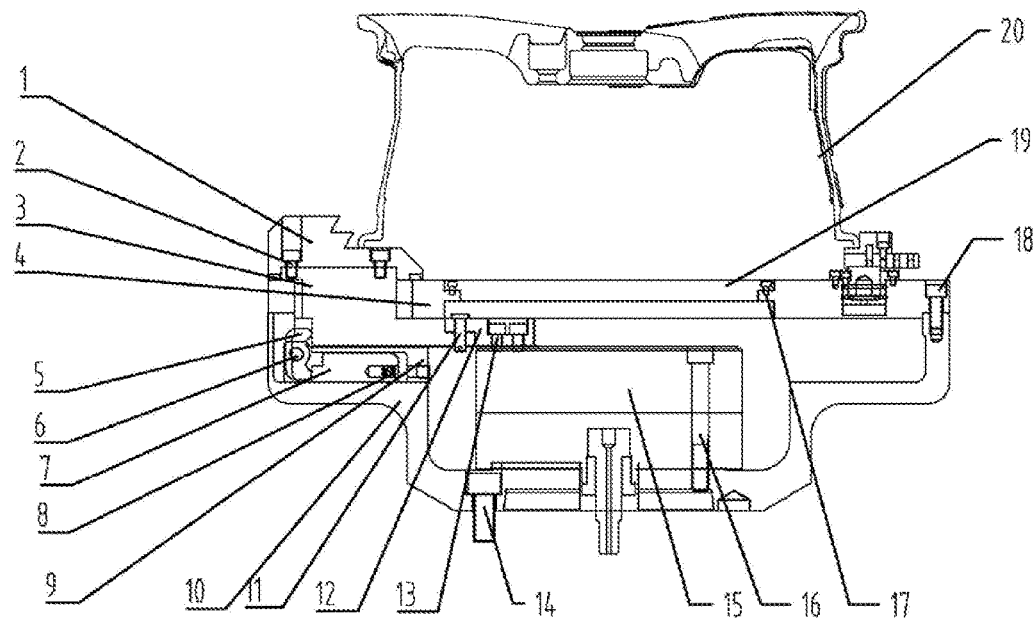
FIG. 1 is a main view of an aluminum alloy hub lathe fixture disclosed by the invention.
Figure 2:
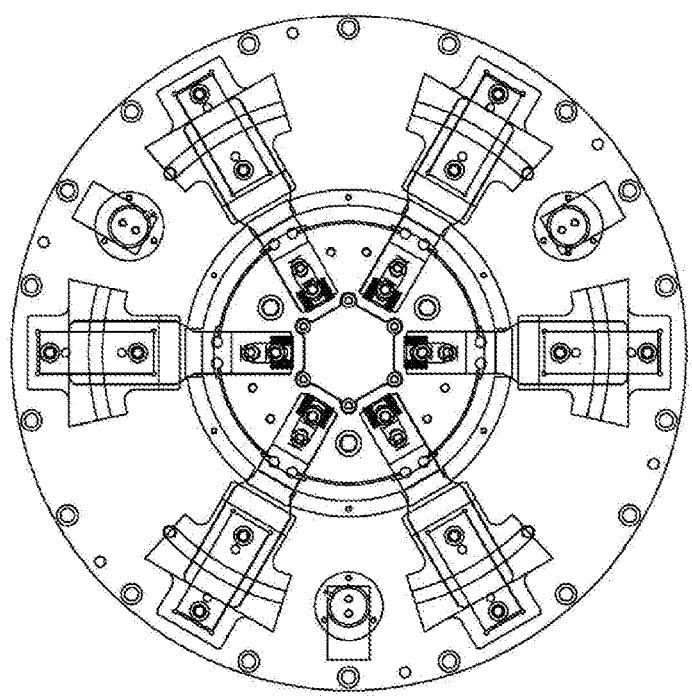
FIG. 2 is a top view of an aluminum alloy hub lathe fixture disclosed by the invention.

In the following, the details and working conditions of a specific device provided by the invention are described in detail in combination with figures.

An aluminum alloy hub lathe fixture comprises a main plate 4, a mounting seat 10, a hydraulic power clamping head 15, a pull rod 12, a sliding seat 3, a connecting pin 11, a fan-shaped clamping jaw 1, a sealing cover 19, a deflection block 5, a deflection shaft 6, a centrifugal force balance block 7. a centrifugal mechanism base 9, a spring 8 and the like, wherein the main plate 4 and the mounting seat 10 are connected together through first screws 18, so that a housing of the entire fixture is formed; all pails and components are mounted in the fixture, and the hydraulic power clamping head 15 is fixed on the mounting seat 10 through second screws 16; one end of the pull rod 12 is mounted on the hydraulic power clamping head 15 through third screws 13, and the other end of the pull rod 12 is connected with the sliding seat 3 through the connecting pin 11; the fan-shaped clamping jaw 1 is fixed on the sliding seat 3 through fourth screws 2; the hydraulic power clamping head 15 can drive the sliding seat 3 and the fan-shaped clamping jaw 1 to move forwards and backwards through the pull rod 12; the deflection block 5, the deflection shaft 6, the centrifugal force balance block 7 and the spring 8 are all mounted on the centrifugal mechanism base 9. so that a centrifugal force balance system is formed and fixed on the mounting seat 10. When the fixture rotates at a high speed, the centrifugal force balance block 7 slips towards the outer side to abut against the lower part of the deflection block 5, so that the deflection block 5 slightly deflects around the deflection shaft 6, the upper part of the deflection block 5 abuts against the sliding seat 3 to have the effect of offsetting the centrifugal force of the sliding seat 3, the spring 8 has the buffering effect, the sealing cover 19 is mounted above the main plate 4 through fifth screws 17 to have the sealing and positioning effects, and the entire fixture is connected with a machine tool through sixth screws 14.

When the entire fixture does not work, through the pull rod 12, the hydraulic power clamping head 15 drives the sliding seat 3 and the fan-shaped clamping jaw 1 to be at positions where the sliding seat 3 and the fan-shaped clamping jaw 1 have largest diameters.

During work, the aluminum alloy hubs 20 need to be put at appropriate positions according to the diameter sizes of the aluminum alloy hubs 20, the hubs with larger diameters are put on an upper step of the fan-shaped clamping jaw 1, and the hubs with smaller diameters are put on a bottom step of the fan-shaped clamping jaw 1;

then, the hydraulic power clamping head 15 drives the sliding seat 3 and the fan-shaped clamping jaw 1 to operate towards the direction of the center of a circle through the pull rod 12, until the positioning and compacting work on the aluminum alloy hubs 20 is completed;

then the entire fixture can rotate at a high speed, namely the aluminum alloy hubs can be cut; in the cutting process, in order to avoid the fan-shaped clamping jaw 1 and the sliding seat 3 from generating outward centrifugal force to cause cutting vibration, under the action of centrifugal force, the centrifugal force balance block 7 can slip towards the outer side and abut against the lower part of the deflection block 7, so that the deflection block 5 slightly deflects around the deflection shaft 6, and the upper part of the deflection block 5 abuts against the sliding seat 3 to have the effect of offsetting the centrifugal force of the sliding seat 3 and the fan-shaped clamping jaw 1.

The invention claimed is:

1. An aluminum alloy hub lathe fixture, comprising: a main plate, a mounting seat, a hydraulic power clamping head, a pull rod, a sliding seat, a connecting pin, a fan-shaped clamping jaw, a sealing cover, a deflection block, a deflection shaft, a centrifugal force balance block, a centrifugal mechanism base and a spring, wherein the main plate and the mounting seat are connected together through a first screws, so that a housing of the entire fixture is formed; all parts and components are mounted in the fixture, the hydraulic power clamping head is fixed on the mounting seat through second screws, one end of the pull rod is mounted on the hydraulic power clamping head through third screws, and the other end of the pull rod is connected with the sliding seat through the connecting pin; the fan-shaped clamping jaw is fixed on the sliding seat through fourth screws, the hydraulic power clamping head drives the sliding seat and the fan-shaped clamping jaw to move forwards and backwards through the pull rod, and the deflection block, the deflection shaft, the centrifugal force balance block and the spring are all mounted on the centrifugal mechanism base, so that a centrifugal force balance system is formed; the sealing cover is mounted above the main plate through fifth screws, and the entire fixture is connected with a machine tool through sixth screws; and wherein the centrifugal force balance system is designed in such a way that under the action of centrifugal force, the centrifugal force balance block can slip towards the outer side and abut against a lower part of the deflection block, so that the deflection block deflects around the deflection shaft, and an upper part of the deflection block abuts against the sliding seat to have the effect of offsetting the centrifugal force of the sliding seat and the fan-shaped clamping jaw.

2. The aluminum alloy hub lathe fixture according to claim 1, wherein when the fixture rotates at a speed that allows the aluminum alloy hub to be cut, the centrifugal force balance block slips towards the outer side and abuts against the lower part of the deflection block, so that the deflection block deflects around the deflection shaft, and the upper part of the deflection block abuts against the sliding seat.

* * * * *